(12) United States Patent
Bertin

(10) Patent No.: US 11,408,755 B2
(45) Date of Patent: Aug. 9, 2022

(54) INDUCTIVE POSITION SENSOR

(71) Applicant: SEMICONDUCTOR COMPONENTS INDUSTRIES, LLC, Phoenix, AZ (US)

(72) Inventor: Jacques Jean Bertin, Pocatello, ID (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 163 days.

(21) Appl. No.: 16/561,390

(22) Filed: Sep. 5, 2019

(65) Prior Publication Data

US 2019/0390981 A1     Dec. 26, 2019

Related U.S. Application Data

(62) Division of application No. 15/802,000, filed on Nov. 2, 2017, now Pat. No. 10,444,037.

(60) Provisional application No. 62/548,941, filed on Aug. 22, 2017.

(51) Int. Cl.
    *G01D 5/20*      (2006.01)

(52) U.S. Cl.
    CPC ........... *G01D 5/2093* (2013.01); *G01D 5/208* (2013.01)

(58) Field of Classification Search
    CPC ........... G01D 5/208; G01D 5/202; G01D 5/20
    See application file for complete search history.

(56) References Cited

U.S. PATENT DOCUMENTS

| | | | |
|---|---|---|---|
| 6,236,199 B1 | 5/2001 | Irie et al. | |
| 8,453,518 B2 | 6/2013 | Diekmann | |
| 9,528,858 B2 | 12/2016 | Bertin | |
| 2004/0041572 A1* | 3/2004 | Lin | G01D 5/2405 324/661 |

(Continued)

OTHER PUBLICATIONS

U.S. Appl. No. 16/112,221, non-final Office Action, dated Jul. 21, 2020.

(Continued)

*Primary Examiner* — Alvaro E Fortich
(74) *Attorney, Agent, or Firm* — Brake Hughes Bellermann LLP

(57) ABSTRACT

A resonant rotor, for use in an inductive position sensor, includes a rotor core, a first rotor coil, and a rotor capacitor. The first rotor coil includes a first twisted rotor loop drawn about the rotor core and the rotor capacitor is connected in series with the first rotor coil. For a second embodiment, the first rotor coil includes a second twisted rotor loop. The first rotor coil has a first symmetry and the inductive position sensor includes a stator. An excitation coil is drawn on the stator and has a second symmetry. The first symmetry substantially corresponds to the second symmetry. A method for determining a position of an object using an inductive position sensor includes generating three electromagnetic fields using respective excitation coils, inducing voltages, respectively, in three receive coils, and determining based on voltages a position of an object coupled to a resonant rotor. The voltages being based on mutual inductances arising between the rotor with each of the excitation and receive coils, and the elimination, by the resonant rotor, of mutual inductances arising between the excitation and receive coils.

18 Claims, 11 Drawing Sheets

(56) References Cited

U.S. PATENT DOCUMENTS

| | | | |
|---|---|---|---|
| 2006/0066167 A1* | 3/2006 | Saito | B60L 50/15 |
| | | | 310/201 |
| 2006/0233123 A1 | 10/2006 | Lee | |
| 2009/0133867 A1 | 5/2009 | Kuckes | |
| 2010/0319467 A1 | 12/2010 | Diekmann et al. | |
| 2012/0175198 A1* | 7/2012 | Thibault | H02K 7/06 |
| | | | 188/71.5 |
| 2013/0003820 A1* | 1/2013 | Malhan | G01L 3/10 |
| | | | 375/238 |
| 2014/0055000 A1* | 2/2014 | Adra | H02K 15/0435 |
| | | | 310/213 |
| 2014/0132253 A1* | 5/2014 | Bertin | G01D 5/2086 |
| | | | 324/207.17 |
| 2014/0167788 A1 | 6/2014 | Fontanet | |
| 2016/0079839 A1* | 3/2016 | Shim | H02K 37/14 |
| | | | 310/49.01 |
| 2016/0273945 A1* | 9/2016 | Olsak | G01D 5/2006 |
| 2017/0166251 A1 | 6/2017 | Shao et al. | |
| 2018/0029223 A1 | 2/2018 | Kitamura et al. | |
| 2019/0072414 A1 | 3/2019 | Utermoehlen | |
| 2019/0097501 A1 | 3/2019 | Lin et al. | |
| 2020/0088549 A1 | 3/2020 | Shao | |
| 2020/0278190 A1 | 9/2020 | Bertini et al. | |

OTHER PUBLICATIONS

U.S. Appl. No. 16/112,221, Non-final Office Action, dated Jan. 21, 2021.
U.S. Appl. No. 15/949,762, non-final Office Action, dated Apr. 22, 2020.
U.S. Appl. No. 16/112,221, Response to non-final Office Action, dated Apr. 17, 2020.
U.S. Appl. No. 16/112,221, Examiner Email and Applicant Response, respectively dated Jun. 30, 2020 and Jul. 8, 2020.
CN Application Serial No. 201910727721.5, Application filed Aug. 8, 2019.
U.S. Appl. No. 15/949,762, Final Office Action, dated Oct. 9, 2020.
U.S. Appl. No. 15/949,762, RCE, Nov. 12, 2020.
U.S. Appl. No. 15/949,762, non-final Office Action, dated Dec. 23, 2020.
U.S. Appl. No. 16/112,221, Resposne to non-final Office Action, dated Oct. 12, 2020.
U.S. Appl. No. 15/949,762, Response to non-final Office Action, dated Mar. 12, 2021.
U.S. Appl. No. 15/949,762, Notice of Allowance, dated Jun. 2, 2021.
U.S. Appl. No. 16/112,221, Response to Non-final Office Action, dated Apr. 9, 2021.
B. Aschenbrenner and B. G. Zagar "Analysis and Validation of a Planar High-Frequency Contactless Absolute Inductive Position Sensor" in IEEE Trans. ON Instrum. and Meas., Mar. 2015, pp. 768-775.
PEEC-Based Numerical Optimization of Compact Radial Position Sensors for Active Magnetic Bearings; Andreas Müsing, Claudius Zingerli, Philipp Imoberdorf, Johann W. Kolar, Power Electronic Systems Laboratory, ETH Zürich, Switzerland.
Shao, Lingmin, "Automotive Inductive Position Sensor" (2017). Electronic Thesis and Dissertation Repository. 4569 https://ir.lib.uwo.ca/etd/4569.
U.S. Appl. No. 17/666,740, Application filed, Feb. 8, 2022.

* cited by examiner

INDUCTIVE POSITION SENSOR

CROSS-REFERENCE TO RELATED APPLICATIONS

This application claims priority to, as a divisional application, U.S. utility patent application Ser. No. 15/802,000, which was filed on Nov. 2, 2017, and to U.S. provisional application No. 62/548,941, filed on Aug. 22, 2017, both applications were filed in the name of inventor Jacques Jean Bertin and are entitled "Inductive Position Sensor," the entire contents of each application are incorporated herein by reference.

TECHNICAL FIELD

The technology described herein generally relates to devices, systems, and methods for determining the angular and/or linear position of an object. More specifically, the technology described herein generally relates to electronic devices, systems, and methods which utilize electromagnetic principles, such as inductance, to determine an angular and/or linear position of an object.

BACKGROUND

Position sensing devices, including inductive position sensors, are widely used today. Various uses include, but are not limited to, automobiles and other vehicles, factory settings, personal products, and otherwise. Inductive position sensors are often used to determine the position of an object, such as brake pedal, a throttle, or otherwise, hereafter defined as a "target." Today, inductive sensors typically include an excitation coil configured to generate an electromagnetic field when electrical current flows through the coil, a receiving coil configured to detect an electrical potential, a voltage, induced in the receiving coil by the currents flowing through the excitation coil, and a rotor. The rotor is configured to disturb the amount of electrical potential induced in the receiving coil based on the rotor's position. The rotor is typically attached, directly or indirectly, to the target, such that as a target's position changes, the rotor's relative position also changes. Such changes in the position of the rotor, in turn, uniquely disturb the voltages induced in the receiving coil such that the position of the rotor, and thereby the target, can be determined based on the changes in the electrical potential induced in the receiving coil. In short, a rotor can be defined to affect the inductive coupling between the excitation coil and the receiving coil by mathematical functions (each a "transfer function"). Circuitry is connected to a receiving coil to detect and determine a rotor's relative position based on the relative amplitudes and changes thereof induced in the receiving coil.

One example of a known inductive position sensor is described in U.S. Pat. No. 9,528,858, which issued on Dec. 27, 2016, in the name of inventor Jacques Bertin, and entitled "Inductive Sensor," the entire contents of which are incorporated herein by reference.

More specifically, inductive position sensors often use a single-turn receiving coil that is laid out in a rotational symmetry around one or more single turn or multi-turn excitation coils, collectively, a "stator." As shown for example in FIG. 1A, a stator 100 often includes a first coil 101 that includes one or more first loops 101$a$-101$n$, and a second coil 102, commonly having only a multi-turns single loop. Both the first coil 101 and the second coil 102 are often drawn onto a single or multiple layer PCB 104. Either of the first coil 101 or second coil 102 may be respectively configured as excitation coils or receive coils. As shown, the first coil 101 commonly includes multiple loops 101$a$-100$n$ drawn across one or more layers of the PCB 104. FIG. 1B provides a representation of a bottom view of the PCB 106 where loops 100$a$-110$n$ of the first coil 101 are drawn. The second coil 102 can be configured in a clockwise or counterclockwise pattern on the top or first layer, a second layer, or using multiple layers of a multi-layer PCB 104.

As shown in FIG. 1C, a common embodiment of a rotor 108 typically includes a rotor coil 110 with symmetry similar to the symmetry used with the first coil 101. The rotor coil 110 is often drawn such that it affects the mutual inductances generated between the first coil 101 and the second coil 102 as a function of the rotor's angular position $\Theta$ and in accordance with one or more transfer functions.

An electrical circuit 112 schematic representation of inductive position sensor is shown in FIG. 1D. The circuit 112 includes three first coils 101-1 to 101-3, functioning as excitation coils, where each coil has one or more loops (not shown). The first coils 101-1 to 101-3 are typically symmetrical and are often respectively offset from each other by 120 degrees, with each loop turning 90 degrees. The first coils 101-1 to 101-3 are connected to an alternating current source (not shown) that provides an alternating current, in sequence, to each of the three coils. Switching of each of the first coils 101-1 to 101-3 "on" and "off" is often accomplished using known devices, such as MOSFET transistors and oscillators (not shown). The circuit 112 also includes a second coil 102 functioning, as a receiving coil, connected to a signal processor (not shown). The signal processor is configured to detect changes in the amplitude of a voltage potential induced in the second coil 102 by the first coils 101-1 to 101-3. Based on the amplitudes detected and changes therein, the relative angular position of a rotor 110 can be determined.

More specifically, an alternating current flowing through the first coils 101-1 to 101-3 generates first electromagnetic fields, which are represented by first field lines 114-1 to 114-3. The first electromagnetic fields are influenced by the position of the rotor coil 110, such that the second coil 102 is induced to generate voltage potentials based on second, modified electromagnetic fields 116-1 to 116-3. The influence of the rotor 110 on the first electromagnetic field 114 such that the receiving coil 102 senses the second electromagnetic fields 116 is commonly defined as a rotor's "transfer function" that can be represented mathematically.

While today's inductive position sensors are generally reliable, they often require too much printed circuit board (PCB) space when compared to other components. For example, inductive position sensors today may utilize 11 mm$^2$. In contrast, processors may utilize as little as 2-3 mm$^2$. Today's inductive position sensor are also complex, requiring the drawing of multiple precise loops to form the second coil 102. Drawing the second coil requires additional PCB area hence additional cost. With processor costs now approaching sensor costs, reductions in the form factor and complexity of inductive position sensors are needed.

Further, electro-magnetic compliance requirements are becoming more stringent. Yet, with conventional inductive position sensors, stators 100 often are susceptible to generating or receiving undesired electromagnetic emissions. For example, when the second coil 102 is configured as an excitation element, it will function as antenna and emit undesired electromagnetic waves. Contrarily, when the second coil 102 is configured as a receiving element, it is often susceptible to external electromagnetic disturbances. Such disturbances may affect the accuracy and sensitivity of the sensor.

Accordingly, a need exists for inductive position sensors that address these and other needs. Such needs are addressed by one or more of the embodiments of the present disclosure.

SUMMARY

The various embodiments of the present disclosure relate in general to inductive position sensors and systems and methods for manufacturing and use thereof. In accordance with at least one embodiment of the present disclosure an inductive position sensor includes an excitation element. The excitation element may include a power source, a control circuit and a first excitation coil coupled to the power source. The first excitation coil may be configured to generate a first electromagnetic field. The inductive position sensor may include a second excitation coil, coupled to the power source, and configured to generate a second electromagnetic field. The inductive position sensor may include a third excitation coil, coupled to the power source, configured to generate a third electromagnetic field. The inductive position sensor may include a control circuit configured to control the flow of electrical currents from the power source into and through one or more pairings of the first excitation coil, the second excitation coil and the third excitation coil. The inductive position sensor may include a rotor configured to be coupled to each of the first electromagnetic field, the second electromagnetic field and the third electromagnetic field, based upon a current position of a target. The inductive position sensor may include a receive element. The receive element may include a signal processor. The inductive position sensor may include receive element having a first receive coil, coupled to the signal processor, configured for at least one of the first electromagnetic field, the second electromagnetic field and the third electromagnetic field to induce a first voltage. The inductive position sensor may include receive element having a second receive coil, coupled to the signal processor, configured for at least one of the first electromagnetic field, the second electromagnetic field and the third electromagnetic field to induce a second voltage. The inductive position sensor may include receive element having a third receive coil, coupled to the signal processor, configured for at least one of the first electromagnetic field, the second electromagnetic field and the third electromagnetic field to induce a third voltage. The inductive position sensor may include a signal processor configured to determine the current position of the rotor based on a received voltage, wherein the received voltage is a combination of at least one of the first voltage, the second voltage and the third voltage.

In accordance with at least one embodiment of the present disclosure an inductive position sensor may include first, second and third excitation coils looped around a stator core. In accordance with at least one embodiment of the present disclosure an inductive position sensor may include first, second and third receive coils looped around the stator core. For at least one embodiment, each of the first, second and third excitation coils are connected to a common excitation node. For at least one embodiment, each of the first, second and third receive coils are connected to a common receive node, In accordance with at least one embodiment of the present disclosure an inductive position sensor may include first, second and third excitation coils are configured as a three-phase circuit. An inductive position sensor may include first receive coil offset on the stator core from the first excitation coil; and each of a first receive coil, second receive coil and a third receive coil may be configured as a three-phase circuit. A corresponding excitation to rotor mutual inductance may exist between each of the first, second and third excitation coils and the rotor. A corresponding rotor to receive mutual inductance may exist between each of the first, second and third receive coils and the rotor. The position of the rotor at a given time may result in a coupling of the corresponding excitation to rotor mutual inductance and the rotor to receive mutual inductance. The coupling may be reflected in at least one of the respective first voltage, second voltage and third voltage.

In accordance with at least one embodiment of the present disclosure an inductive position sensor may include a first excitation switch coupling a first excitation coil to a power source. An embodiment may include a second excitation switch coupling a second excitation coil to the power source. An embodiment may include a third switch coupling a third excitation coil to the power source. A first receive switch may couple a first receive coil to a signal processor. A second receive switch may couple a second receive coil to the signal processor. A third receive switch may couple a third receive coil to the signal processor. A control circuit may configure the first, second and third excitation switches, at a first time, into a second anti-series configuration. The signal processor may be configured to receive the received voltage, and determine the position of the rotor, at the first time, as a function of the received voltage.

In accordance with at least one embodiment of the present disclosure for an inductive position sensor, the mutual inductances arising between the excitation coils and rotor and between rotor and receive coils are approximated by a sine waveform function of the rotor position. For at least one embodiment, the received voltage is approximated by a sine waveform function of twice the rotor position.

In accordance with at least one embodiment of the present disclosure for an inductive position sensor, a first excitation coil comprises at least one set of first excitation loops, a second excitation coil comprises at least one set of second excitation loops, and a third excitation coil comprises at least one set of third excitation loops. For at least one embodiment, the first, second and third excitation loops are drawn in series on a stator core. The stator core may include a multi-layer printed circuit board.

In accordance with at least one embodiment of the present disclosure for an inductive position sensor, a received voltage is proportional to a mutual inductance arising at a given time between one of the first, second and third coils and the rotor for a primary-secondary pairing of at least one of: the first receive coil and the second receive coil; the second receive coil and the first receive coil; the first receive coil and the third receive coil; the third receive coil and the first receive coil; the second receive coil and the third receive coil; and the third receive coil and the second receive coil. For at least one embodiment, a rotor includes a rotor coil comprising a first rotor loop, a first excitation coil includes a first excitation loop, and the first rotor loop is symmetrical with the first excitation loop. For at least one embodiment, the rotor includes a resonant rotor loop.

In accordance with at least one embodiment of the present disclosure, a resonant inductive position sensor may include a rotor, two or more excitation coils, inductively coupled to the rotor, two or more receive coils, inductively coupled to each of the rotor and the two or more excitation coils, and configured to generate a received voltage, a resonance component connected to one of the two or more excitation coils or t rotor, and an integrated circuit, wherein the integrated circuit is configured to determine the position of the rotor based on the two or more received voltages. For at least one embodiment, the two or more excitation coils may be configured as twisted excitation loops about a stator core. For at least one embodiment, the two or more receive coils may be configured as twisted receive loops about the stator core. For at least one embodiment, the rotor may include a rotor coil having a twisted rotor loop. For at least one embodiment, one or more or each of the twisted excitation loops and the twisted receive loops may be symmetrical with the twisted rotor loop. For at least one embodiment, the twisted rotor loop may include a capacitor.

In accordance with at least one embodiment of the present disclosure, a resonant rotor for use in an inductive position sensor may include a rotor core, a rotor coil, and a resonant component. For at least one embodiment, the rotor coil may include at least one twisted rotor loop drawn about the rotor core. For at least one embodiment, the resonant component may be connected to the twisted loop to provide inductive-capacitive filtering for the resonant rotor. For at least one embodiment, at least one twisted rotor loop may be symmetrical to at least one of an excitation loop and a receive loop drawn about a stator core of a stator. For at least one embodiment, a combination of a stator and a resonant rotor may be configured to provide a resonant inductive position sensor.

BRIEF DESCRIPTION OF THE DRAWINGS

The features, aspects, advantages, functions, modules, and components of the devices, systems and methods provided by the various embodiments of the present disclosure are further disclosed herein regarding at least one of the following descriptions and accompanying drawing figures. In the appended figures, similar components or elements of the same type may have the same reference number, such as 108, with an additional alphabetic designator, such as 108a, 108n, etc., wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

Figure 1A:
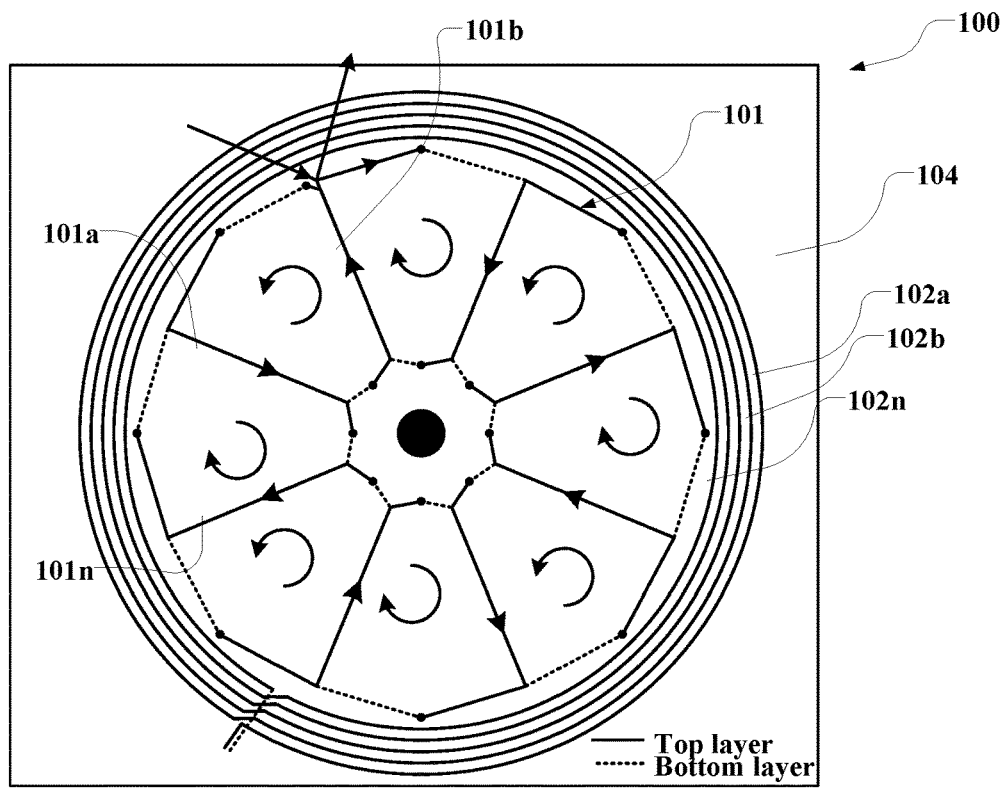
FIG. 1A is a schematic representation of a top view of stator used in conjunction with one or more conventional inductive position sensors.
Figure 1B:
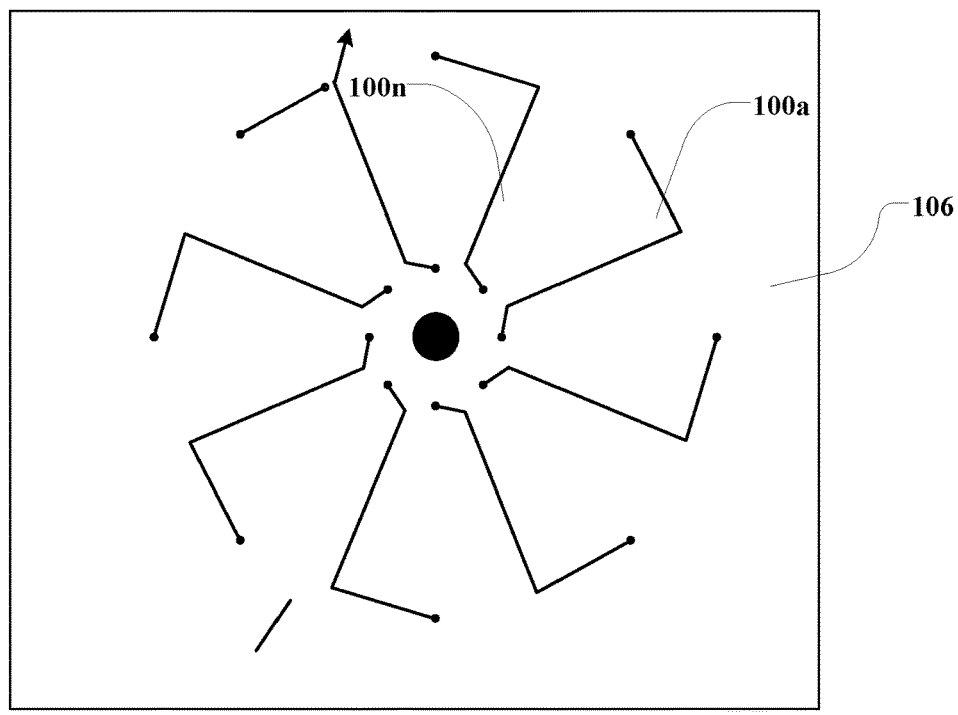
FIG. 1B is schematic representation of a bottom view of a stator used in conjunction with one or more conventional inductive position sensors.
Figure 1C:
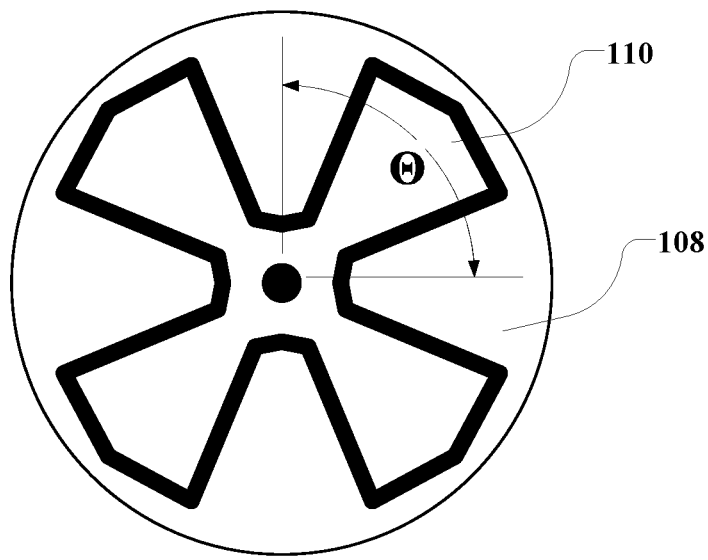
FIG. 1C is schematic representation of a rotor as used in conjunction with one or more conventional inductive position sensors.
Figure 1D:
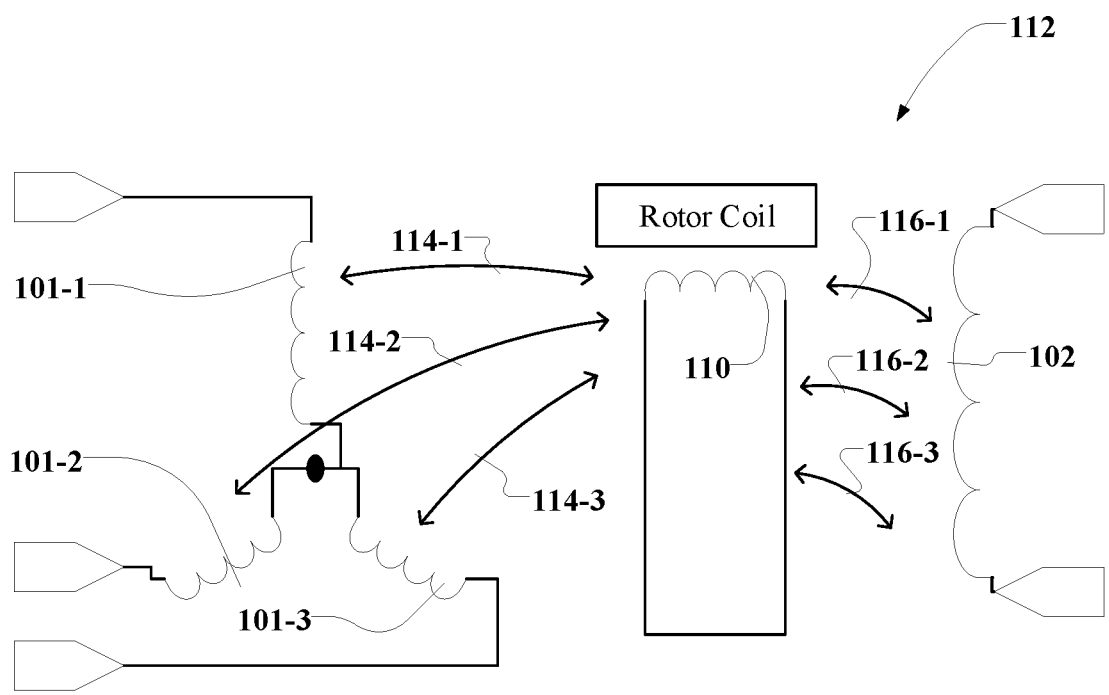
FIG. 1D is a schematic representation of an electrical circuit formed by one or more conventional inductive position sensors.
Figure 2A:
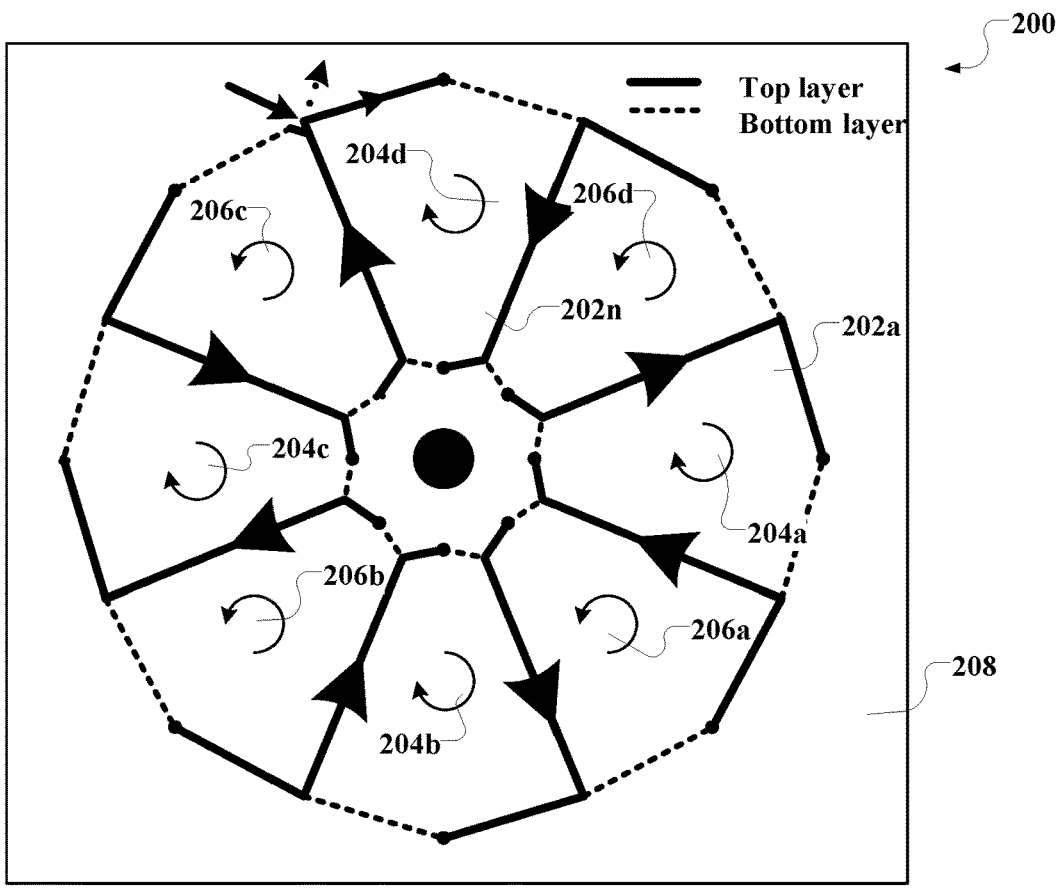
FIG. 2A is a schematic representation of a stator for use in an inductive position sensor and in accordance with at least one embodiment of the present disclosure.

The various embodiments described herein are directed to devices, systems, and methods for inductively determining the position of an object. As shown in FIGS. 2A-2C, at least one embodiment of a stator for use in an inductive position sensor of the present disclosure, includes a stator 200 having at least two excitation coils, as designated by X1 and X2, and at least two receive coils, as designated by R1 and R2. For at least one embodiment, a third excitation coil X3 and a third receive coil R3 may be used (as further shown in FIG. 2D). Each of the two or more excitation coils "X1-X3" and the two or more receive coils "R1-R3" are respectively offset by 120 degrees and include a twisted loop design 202a-n through a multi-layer stator core 208, as shown for a single coil and for purposes of illustration and explanation in FIG. 2A and FIG. 2B. A PCB may provide the stator core 208 for the coils used in generating electromagnetic fields when current is forced through the coils. Each of the loops is commonly turned by 180 degrees relative to an immediately preceding loop. It is to be appreciated that the offsetting nature of the twisted loop design 202a-n minimizes the generation and reception of unintended electromagnetic fields and waves, such as the clockwise (right-hand) fields 204a-d and the counter-clockwise (left-hand) fields 206a-d shown in FIG. 2A. Symmetrical loops may be used for each coil to minimize the even harmonics of the sensor transfer function. Further, the third harmonics of the sensor transfer function may be minimized when two of the coils are connected in series. However, other offsets may be used for other embodiments, with accordingly and computable changes in the transfer functions by a person having ordinary skill in the art.

Figure 2E:
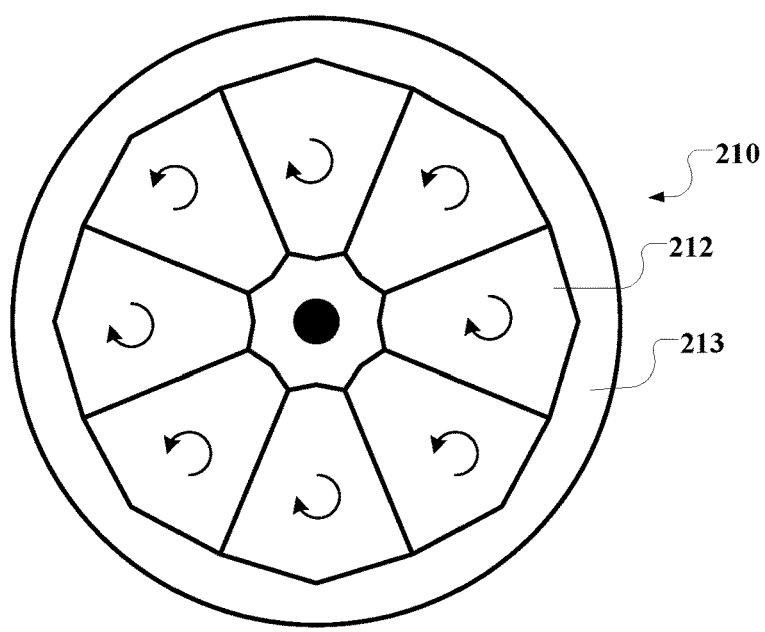
FIG. 2E is a schematic representation of a rotor for use in an inductive position sensor and in accordance with at least one embodiment of the present disclosure.
Figure 2B:
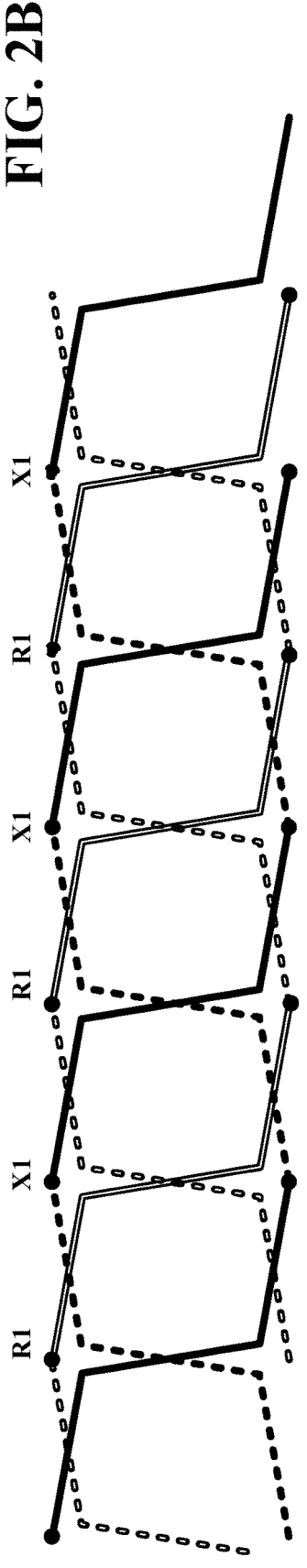
FIG. 2B is a schematic representation of a stator into which are drawn a first excitation coil "X1" and a first receive coil "R1" and in accordance with at least one embodiment of the present disclosure.
Figure 2C:
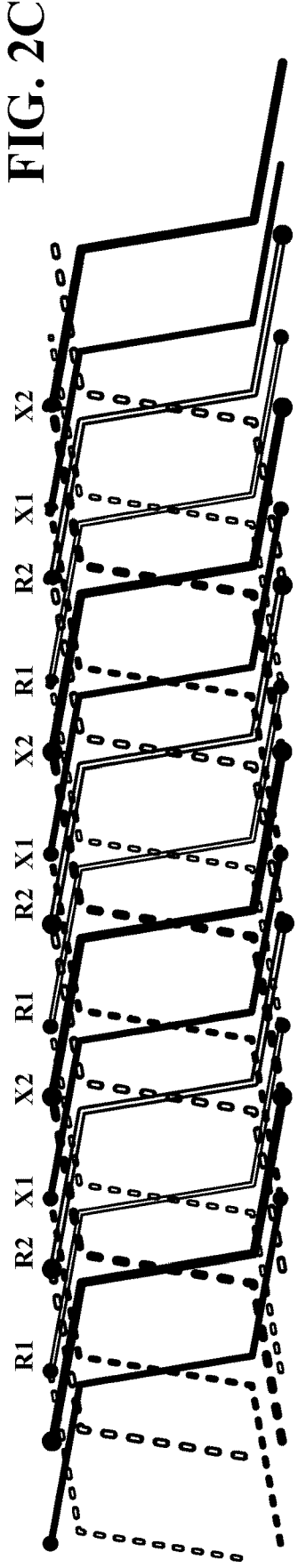
FIG. 2C is a schematic representation of a stator into which are drawn a first excitation coil "X1", a second excitation coil "X2", a first receive coil "R1" and a second receive coil "R2" and in accordance with at least one embodiment of the present disclosure.
Figure 2D:
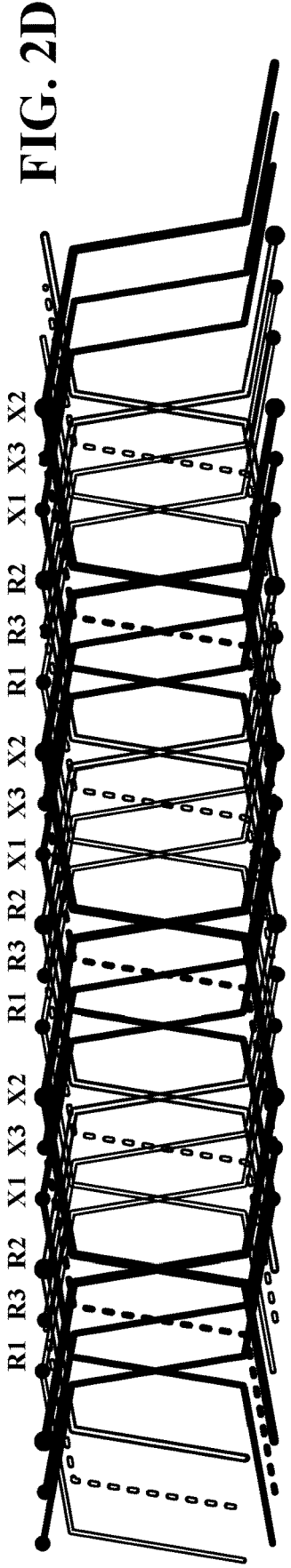
FIG. 2D is a schematic representation of a stator into which are drawn a first excitation coil "X1", a second excitation coil "X2", a third excitation coil "X3", a first receive coil "R1", a second receive coil "R2", and a third receive coil "R3" and in accordance with at least one embodiment of the present disclosure.

In FIGS. 2B-2D, a representation of one embodiment of a stator having three excitation coils and three receive coils is shown. More specifically, FIG. 2B shows a representation of a stator onto which has been drawn a first excitation coil X1 and a first receive coil R1. FIG. 2C shows the stator of FIG. 2C as additionally having drawn thereon a second excitation coil X2 and a second receive coil R2. FIG. 2D shows the stator of FIG. 2D with the addition of having drawn thereon a third excitation coil X3 and a third receive coil R3. It is to be appreciated that any number of excitation and/or receive coils may be used in accordance with an embodiment of the present disclosure. Further, it is to be appreciated that the drawing of the coils onto a PCB or other substrate may occur using any known processes. Such drawing may include the drawing of any or all of the coils at any given process step and the present disclosure is not to be considered as being limited to a sequential drawing of coils or otherwise. The coils may be drawn, deposited, or otherwise formed in a PCB or other substrate using any known or desired compounds, such as copper, aluminum, gold, or others. In accordance with at least one embodiment, each of the first, second and third coils (both excitation and receive) are drawn on the PCB.

Figure 2F:
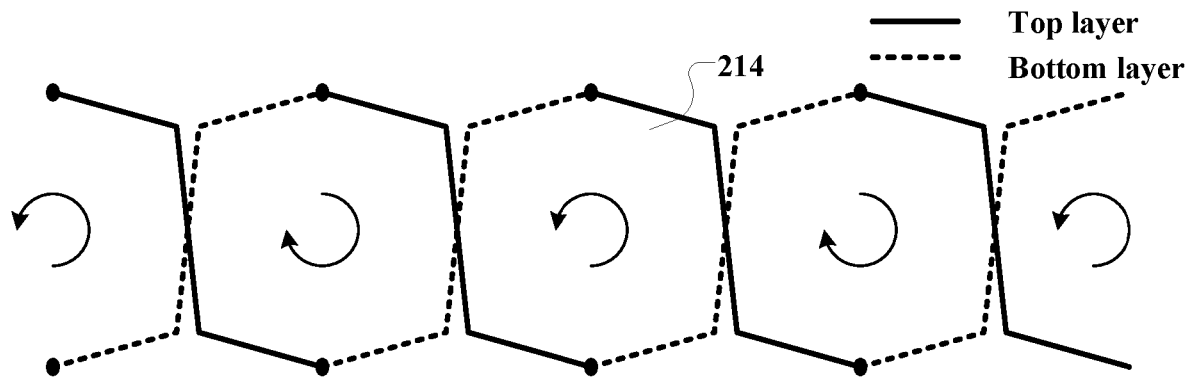
FIG. 2F is a schematic representation of a rotor having a twisted loop design drawn on a multi-layer printed circuit board and in accordance with at least one embodiment of the present disclosure.

In FIG. 2E, a rotor 210 for use with at least the stator embodiment of FIGS. 2A-2D is shown. The rotor 210 may be fabricated on a rotor core 213 of any desired substance, such as a PCB or other substrate. The rotor 210 includes a conductive material that may be configured in a coil or any other conductive shape. The rotor 210 may be sized and configured to facilitate the detection of any desired range of rotational and/or linear movements. The rotor 210 may include at least one rotor coil 212. The rotor coil 212 may include a twisted loop design (as shown in FIG. 2E). As further shown in FIG. 2F where a multi-layer PCB or similar material is used for the rotor 210, the rotor coil 212 may include two or more twisted loops 214 drawn between each of a top layer and a bottom layer of the rotor core 213.

Figure 2G:
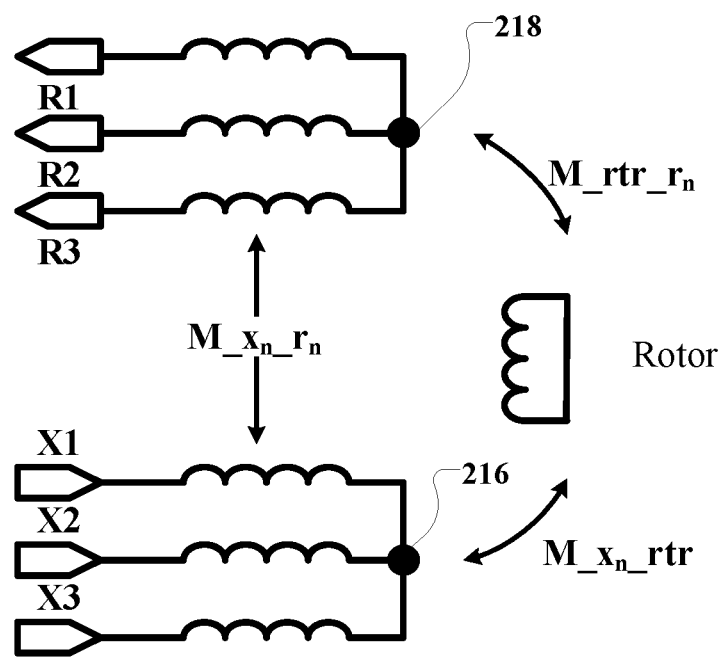
FIG. 2G is a schematic representation of the mutual inductances arising between the various components of an inductive position sensor and in accordance with at least one embodiment of the present disclosure.

It is to be appreciated that by use of the stator 200 and rotor 210 designs described above for at least one embodiment, whenever coils are drawn, mutual inductances are generated between the respective excitation coils and receive coils. When the two or more excitation and two or more receive coils are respectively configured using a common excitation node 216 and a common receive node 218, as shown in FIG. 2G, these mutual inductances are represented by: "$M\_x_n\_r_n$" (designating the inductance between excitation coil Xn and receive coil Rn, where n is an integer); "$M\_x_n\_rtr$" (designating the inductance between excitation coil Xn and the rotor "rtr"; and $M\_rtr\_r_n$ (designating the inductance between the rotor and receiving coil Rn. For at least one embodiment, $M\_x_n\_rtr$ and $M\_rtr\_r_n$ have the same magnitudes. For at least one embodiment, $M\_x_n\_r_n$ is much smaller than $M\_x_n\_rtr$ and $M\_rtr\_r_n$ and each of $M\_x_n\_rtr$, $M\_rtr\_r_n$, and $M\_x_n\_r_n$ are greater than zero. For at least one embodiment, $M\_x_n\_r_n$ is minimized. For at least one embodiment, the amplitudes of $M\_x_n\_rtr$ and $M\_rtr\_r_n$ are maximized. It is to be appreciated that depending on the position of the rotor some mutual inductances may be zero or negative.

Figure 3A:
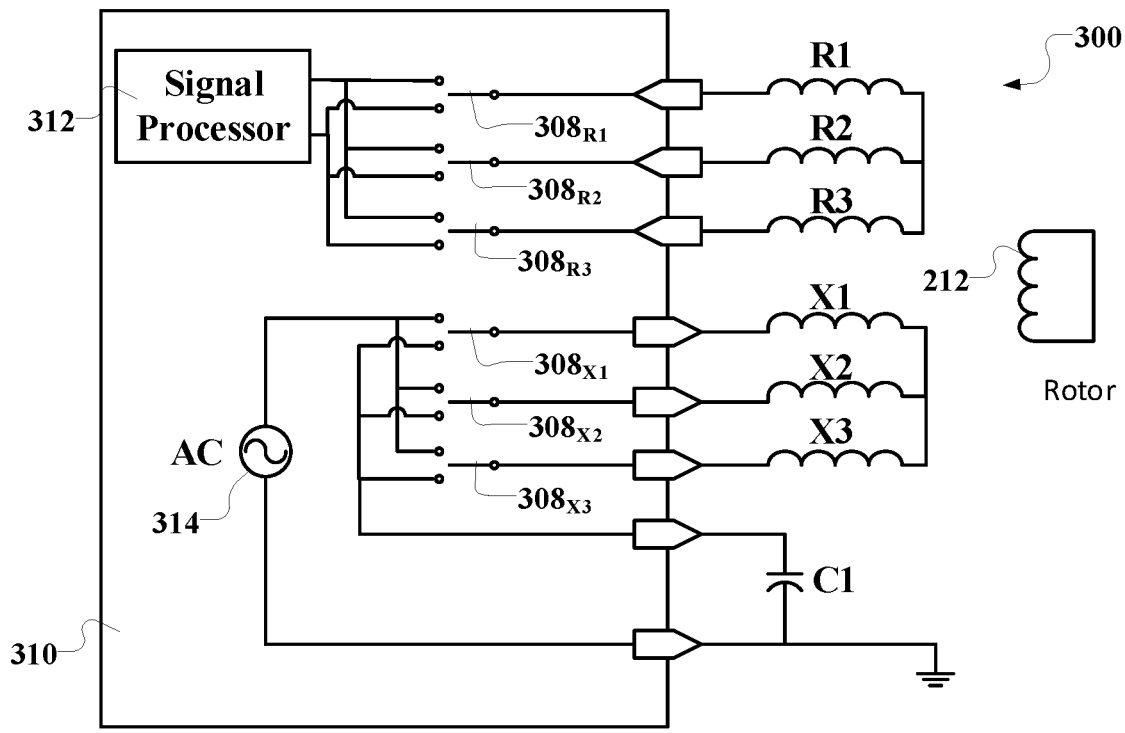
FIG. 3A is a schematic representation of an inductive position sensor having a resonant excitation circuit and in accordance with at least one embodiment of the present disclosure.
Figure 3B:
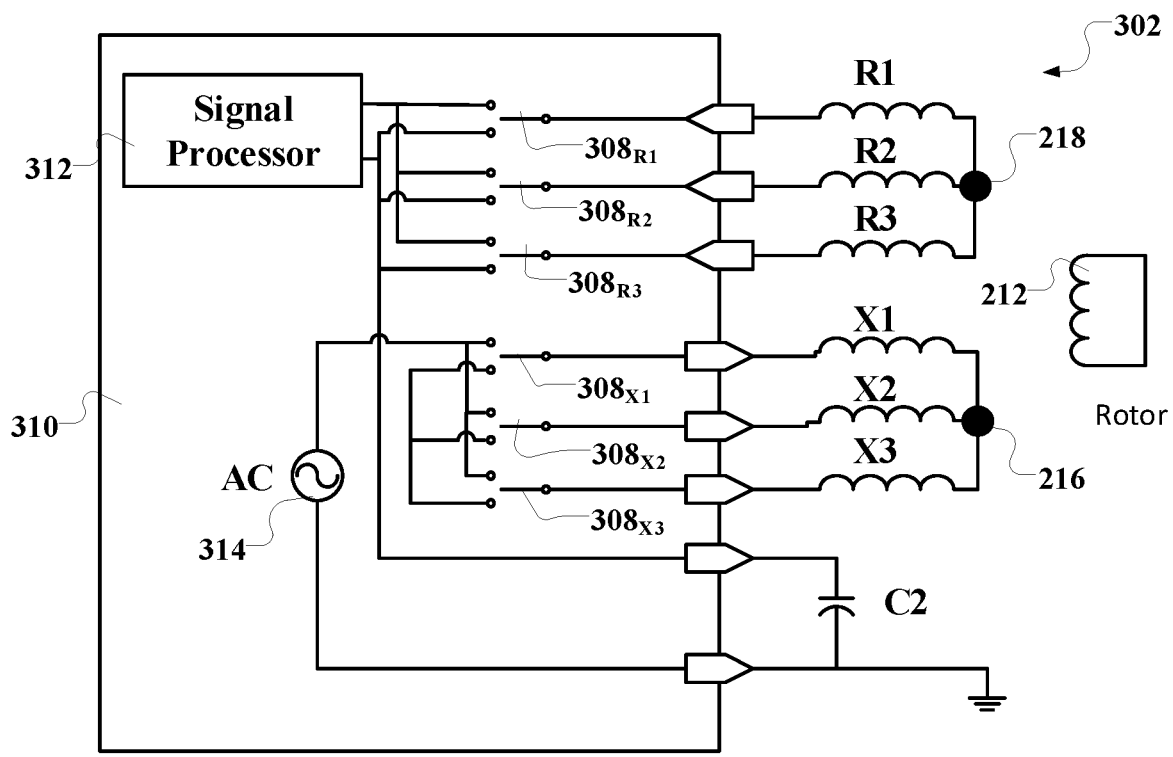
FIG. 3B is a schematic representation of an inductive position sensor having a resonant receive circuit and in accordance with at least one embodiment of the present disclosure.
Figure 3C:
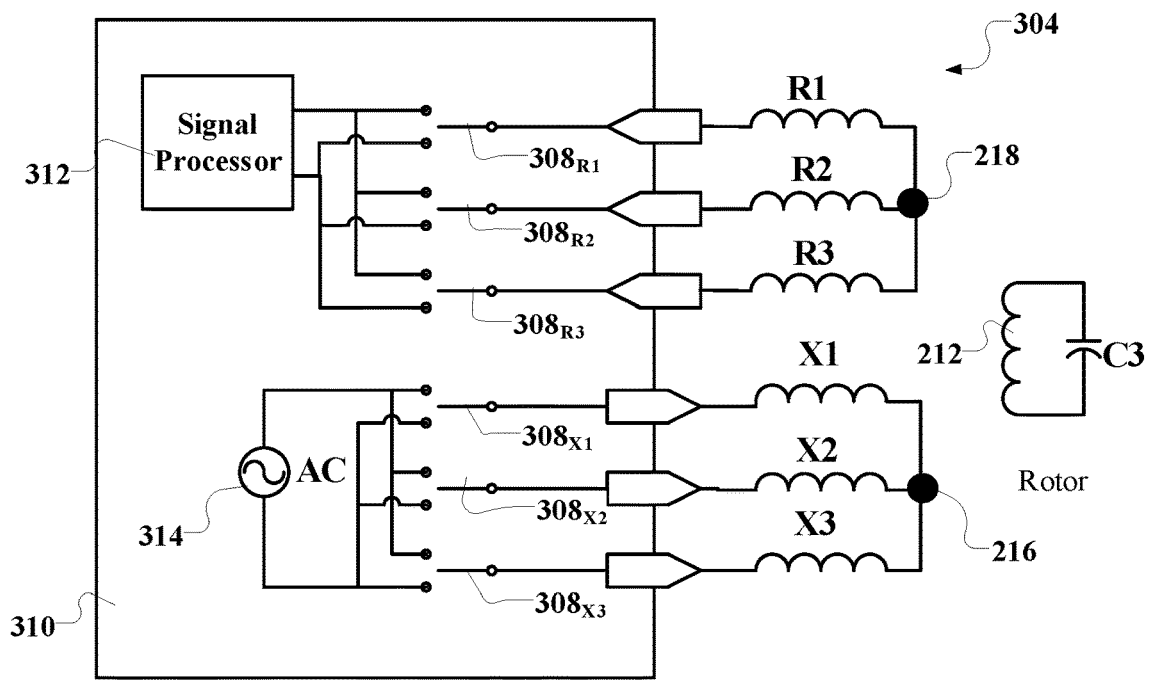
FIG. 3C is a schematic representation of an inductive position sensor having a resonant rotor circuit and in accordance with at least one embodiment of the present disclosure.

As shown in FIGS. 3A-3C, an integrated circuit 310 for use in at least one embodiment includes a control circuit, not shown, configured to control the operation of excitation switches $308_{X1}$-$308_{X3}$ and receive switches $308_{R1}$-$308_{R3}$. The excitation switches $308_{X1}$-$308_{X3}$ connect a corresponding excitation coil to an alternating current source 314. The receive switches $308_{R1}$-$308_{R}$ connect a corresponding receive coil to the signal processor 312.

In accordance with at least one embodiment of the present disclosure, an inductive position sensor may be configured to include three excitation coils X1-X3, where a first excitation coil X1 is offset by 120 degrees respectively from each of a second excitation coil X2 and a third excitation coil X3. Such a configuration may be expressed mathematically in terms of the mutual inductances created between a given excitation coil and the rotor as a set of transfer functions, as shown by Equation Set 1 below, where "x" is the rotor's angular position.

$Mx1\_rtr=F(x)$ $Mx2\_rtr=F(x+120)$ $Mx3\_rtr=F(x+240)$     Equation Set 1

Further, an inductive position sensor may be configured in accordance with at least one embodiment of the present disclosure to include three receive coils R1-R3, where a first receive coil R1 is offset by 90 degrees from a corresponding first excitation coil X1, and the first receive coil R1 is offset 120 degrees respectively from each of a second receive coil R2 and a third receive coil R3. Such a configuration may be expressed mathematically in terms of the mutual inductances created between a given receive coil and the rotor as a set of transfer functions, as shown by Equation Set 2 below, where "x" is the rotor's angular position.

$$M_{R1\_rtr}=F(x+90)$$

$$M_{R2\_rtr}=F(x+210)$$

$$M_{R3\_rtr}=F(x+330) \quad \text{Equation Set 2}$$

It is to be appreciated, the using a Fourier series, F(x) can be approximated. By use of twisted loop in the rotor, a constant term in the Fourier series is zero. Further, due to the symmetry of the coils (both excitation and receive) the even harmonics in the Fourier series are minimized. Further, the fifth and higher harmonics in the Fourier series may be neglected. Accordingly, the excitation coil X1-X3 to rotor inductances may be approximated by use of the Fourier series shown in Equation Set 3, and the receive coil to rotor inductances may be approximated by use of the Fourier series shown in Equation Set 4, where A1 is the fundamental amplitude and A3 is the amplitude of the third harmonic.

$$M_{X1\_rtr}=A_1 \sin(x)+A_3 \sin(3x)$$

$$M_{X2\_rtr}=A_1 \sin(x+120)+A_3 \sin(3x+360)$$

$$M_{X3\_rtr}=A_1 \sin(x+240)+A_3 \sin(3x+720) \quad \text{Equation Set 3}$$

$$M_{R1\_rtr}=A_1 \sin(x+90)+A_3 \sin(3x+270)$$

$$M_{R2\_rtr}=A_1 \sin(x+210)+A_3 \sin(3x+630)$$

$$M_{R3\_rtr}=A_1 \sin(x+330)+A_3 \sin(3x+990) \quad \text{Equation Set 4}$$

Further, it is to be appreciated that as the three combinations of coils, X1R1, X2R2 and X3R3, are induced, a three-phase signal is received by the receiving coils R1-R3 and provided to a signal processor configured to calculate the position "X" of the rotor at that time. Further, due to the 3-phases of the coil design the third harmonics can be removed such that the received signal R(x) is proportional to twice the cosine of the position of the rotor "x", as shown by Equation Set 5. An AC excitation current is forced through the coils X1 and X2 in anti-series (the current flows from the integrated circuit 310 to X1, reaches the common node and returns to the integrated circuit 310 through X2 but in opposite direction, as expressed by Xi-j (where "i" identifies a "primary" or forward path coil and "j" identifies a "secondary" or return-path coil) as expressed by the negative ("−") sign in Equation 5. It is to be appreciated that the "i—primary" and the "j—secondary" designators are used herein for purposes of identification of coil pairings. The induced voltage across the coils R1 and R2 is measured with the two coils R1 and R2 being in anti-series, as expressed by Ri-j and the second negative ("−") sign in Equation 5. The induced voltage, the received voltage, is proportional to the mutual inductances between the excitation coils to rotor and the rotor to receiver coils, as expressed by the multiply ("*") sign in the Equation 5. Similarly, $R_{2\_3}(x)$ and $R_{3\_1}(x)$ (or $R_{3\_2}$ or $R_{1\_3}$ or $R_{2\_1}$) may be computed. For at least one embodiment, the excitations can occur sequentially to measure at least two $R_{i\_j}(x)$ to calculate the position "x". For at least one embodiment, the received voltage may be calculated as a fixed combination, a changing over time combination, a multiplexing or otherwise of one or more of the $R_{i\_j}(x)$ positions. For at least one embodiment, parallel excitation of all excitation coils may be used, provided the relative amplitude of the excitation currents is known such that x can be extracted from the measurements of $R_{i\_j}$.

Equation Set 5

$$R_{1-2}(x) = [\{A_1\sin(x) + A_3\sin(3x)\} - \{A_1\sin(x+120) + A_3\sin(3x+360)\}] *$$
$$[\{A_1\sin(x+90) + A_3\sin(3x+270)\} - \{A_1\sin(x+210) +$$
$$A_3\sin(3x+630)\}] = [A1\sin(x) - A1\sin(x+120)] *$$
$$[A1\sin(x+90) - A1\sin(x+210)] = -1.5A_1^2\cos(2x+210)$$

$$R_{2-3}(x) = [\{A_1\sin(x+120) + A_3\sin(3x+360)\} -$$
$$\{A_1\sin(x+240) + A_3\sin(3x+720)\}] *$$
$$[\{A_1\sin(x+210) + A_3\sin(3x+630)\} -$$
$$\{A_1\sin(x+330) + A_3\sin(3x+990)\}] =$$
$$[A1\sin(x+120) - A1\sin(x+240)] * [A1\sin(x+210) -$$
$$A1\sin(x+330)] = -1.5A_1^2\cos(2x+270)$$

$$R_{3-1}(x) = [\{A_1\sin(x+240) + A_3\sin(3x+720)\} - \{A_1\sin(x) + A_3\sin(3x)\}] *$$
$$[\{A_1\sin(x+330) + A_3\sin(3x+990)\} -$$
$$\{A_1\sin(x+90) + A_3\sin(3x+270)\}] =$$
$$[A1\sin(x+240) - A1\sin(x)] *$$
$$[A1\sin(x+330) - A1\sin(x+90)] =$$
$$-1.5A_1^2\cos(2x+150)$$

Figure 3D:
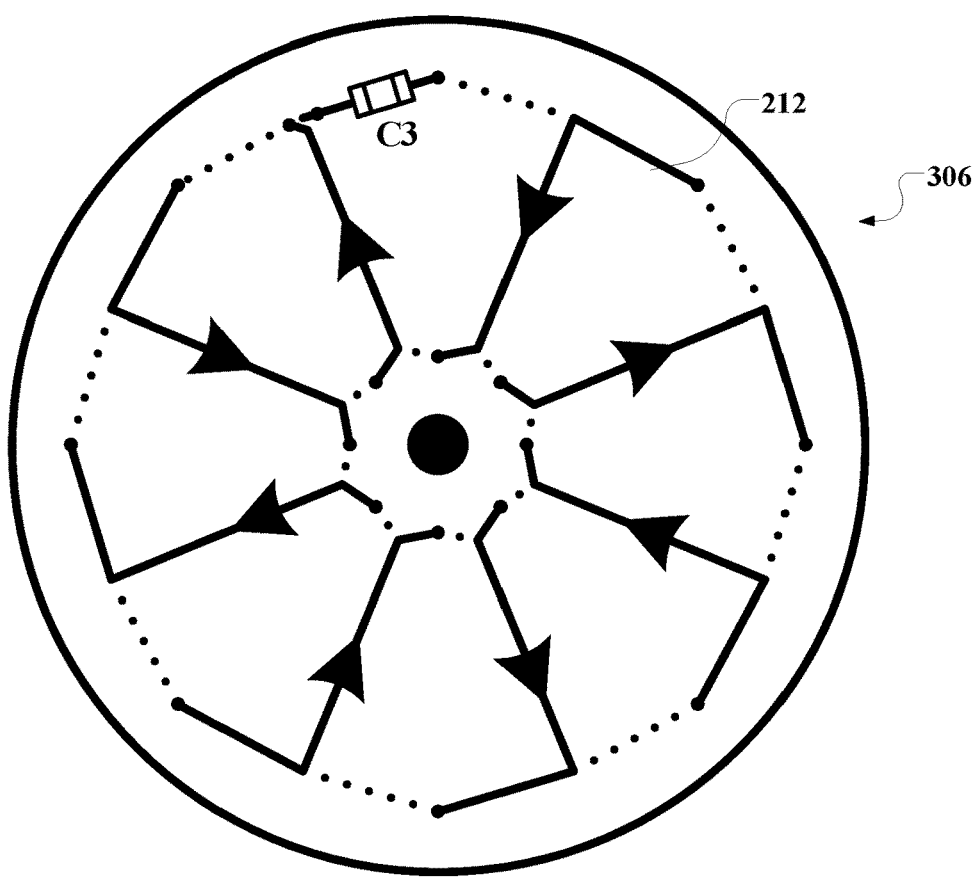
FIG. 3D is a schematic representation of a resonant rotor for use in an inductive position sensor having a resonant rotor circuit and in accordance with at least one embodiment of the present disclosure.

As shown by Equation Set 5, it is to be appreciated that the received voltage(s) can be approximated by a sine waveform function of the rotor position. For at least one embodiment, the approximation is a function of twice the rotor position. It is to be appreciated that the received voltage signal is often in the range of 0.1 to 10 millivolts. Such low voltages can be susceptible to interference. In accordance with at least one embodiment of the present disclosure, a resonant inductive position sensor is disclosed. A resonant inductive position sensor may include a resonant excitation circuit 300 having a capacitor C1 electrically connected to one or more of the excitation coils X1-X3 as shown in FIG. 3A, a resonant receive circuit 302 having a capacitor C2 electrically connected to one or more of the receive coils R1-R3 as shown in FIG. 3B, or a resonant rotor circuit 304 having a capacitor C3 electrically connected in parallel to the rotor coil 212 as shown in FIGS. 3C and 3D. The capacitance for capacitors C1, C2 and C3 may be selected in view of known resonant (LC) circuit principles. It is to be appreciated that for at least one embodiment, by using a resonant circuit for one of the coils, the received signal may be more than ten time (10×) larger than the signal received when a non-resonant circuit is utilized. Further, it is to be appreciated that a resonant rotor circuit 304 may be used to address mutual inductance concerns that may arise when the traces/loops for the excitation coils X1-X3 and the traces/loops for the receive coils R1-R3 may be in close proximity, such as when such traces are drawn on a common PCB and/or interfaced with a common integrated circuit. These mutual inductances may disturb the received signal, as transferred via the rotor, by introducing signals that are independent of the rotor's position. Given that the received voltages arising due to any mutual inductance between the excitation and receive coils will often be in quadrature, while the received voltages arising from the resonant rotor will be in phase. It is to be appreciated that the received voltages will commonly be in phase when a resonant rotor is used, and the excitation frequency is not far from the resonance of the received voltage arising from the rotor. Otherwise, the received voltage may be in quadrature and superposed on the received voltage coming directly from the excitation. Further, for at least one embodiment, the resonant rotor circuit 304 can provide the enhanced signal strengths achievable using a resonant circuit, while eliminating any disturbances caused due to mutual inductance between the excitation and receive coils by removing the quadrature signal, for example, by use of a synchronous rectifier. Accordingly, it is to be appreciated that for at least one embodiment of the present disclosure a resonant rotor may be used.

Figure 4A:
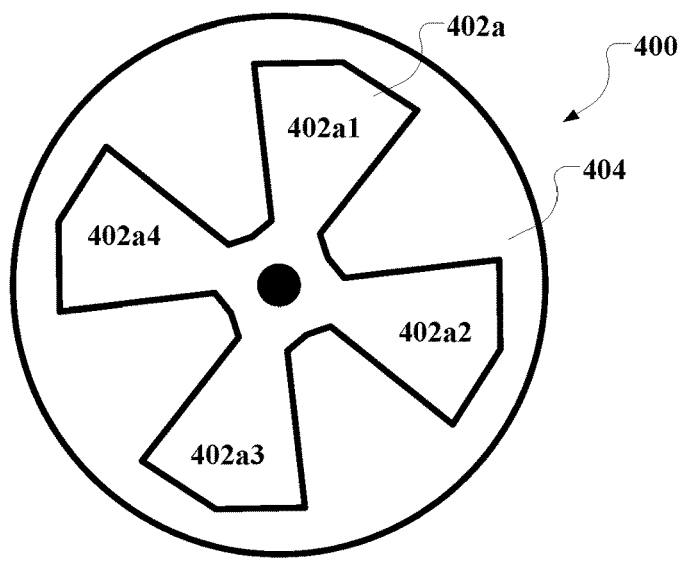
FIG. 4A is a schematic representation of a first single-turn coil drawn on a rotor for use with an inductive position sensor and in accordance with at least one embodiment of the present disclosure.
Figure 4B:
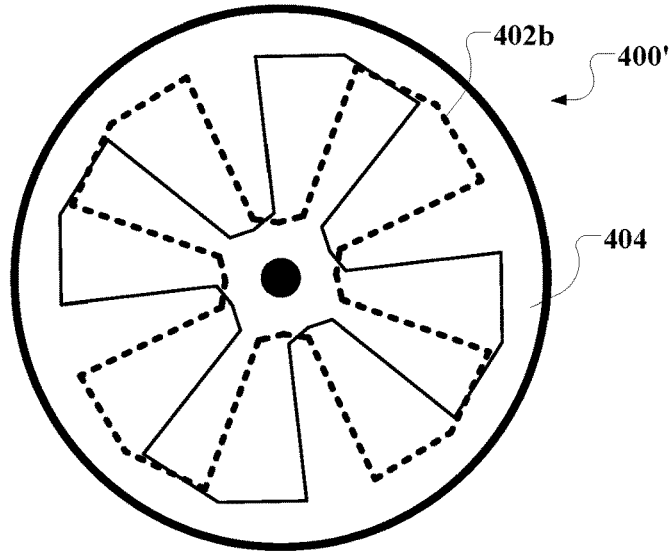
FIG. 4B is a schematic representation of a first coil and a second coil drawn in series on a multi-layer PCB rotor for use with an inductive position sensor and in accordance with at least one embodiment of the present disclosure.
Figure 4C:
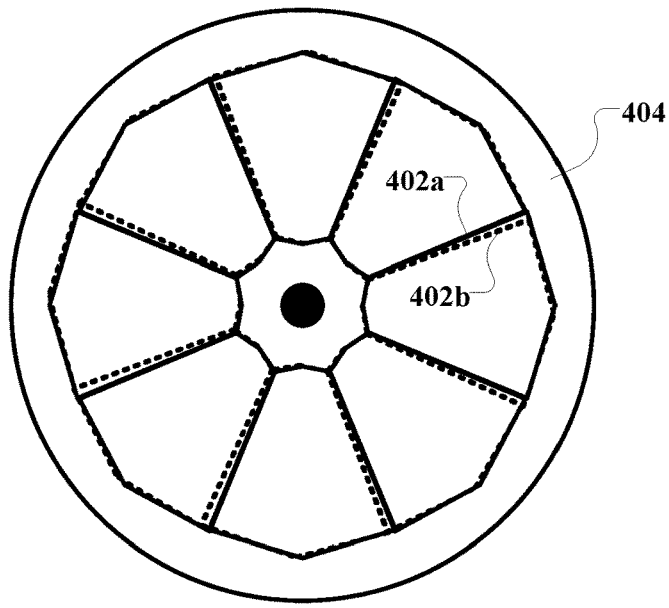
FIG. 4C is a schematic representation of the second coil drawn at half the symmetry offset of the first coil on a multi-layer PCB rotor for use with an inductive position sensor and in accordance with at least one embodiment of the present disclosure.

Further, it is to be appreciated however, that the mutual inductances generated may not be ideal, especially when the rotor 210 is in close proximity to the stator 200 and a maximum amplitude (of $A_1$) results or when the PCB 208 is small. These concerns can be addressed in accordance with at least one embodiment of the present disclosure by using a multi-coil rotor 400 having at least two coils 402a-c. For at least one embodiment, the multi-coil rotor 400 may include a capacitor (not shown) to provide the benefits of a resonant rotor circuit. As shown in FIG. 4A, a first rotor coil 402a may be drawn on a substrate 404. As further shown in FIG. 4B, a second rotor coil 402b may be drawn on the substrate 404. For at least one embodiment, the coils 402a-402b may include a twisted loop design. The twisted loop design may have any number of loops, such as loops 402a1-402a4. For at least one embodiment, the loops 402a1-402a4 may be drawn symmetrically. For at least one embodiment, the loops 402a1-402a4 may be offset by 90 degrees relative to a next loop. For at least one embodiment, the loops 402a1-402a4 may be drawn across a single layer or a multi-layer substrate 404, such as a single or multi-layer PCB. For at least one embodiment, the symmetry of the rotor matches the symmetry of a corresponding stator. A plurality of rotor coil loops may be used to form multiple coils connected on one or more layers of a PCB. It is to be appreciated, that many coils may exist over the rotor, and for at least one embodiment, a rotation of the coils by half the rotational symmetry will result in an alignment of a second set of loops 402b that match a first set of loops 402a, as shown in FIG. 4C (where a slightly less than half rotation is used to show substantial alignment of the two loops 402a and 402b).

Figure 4D:
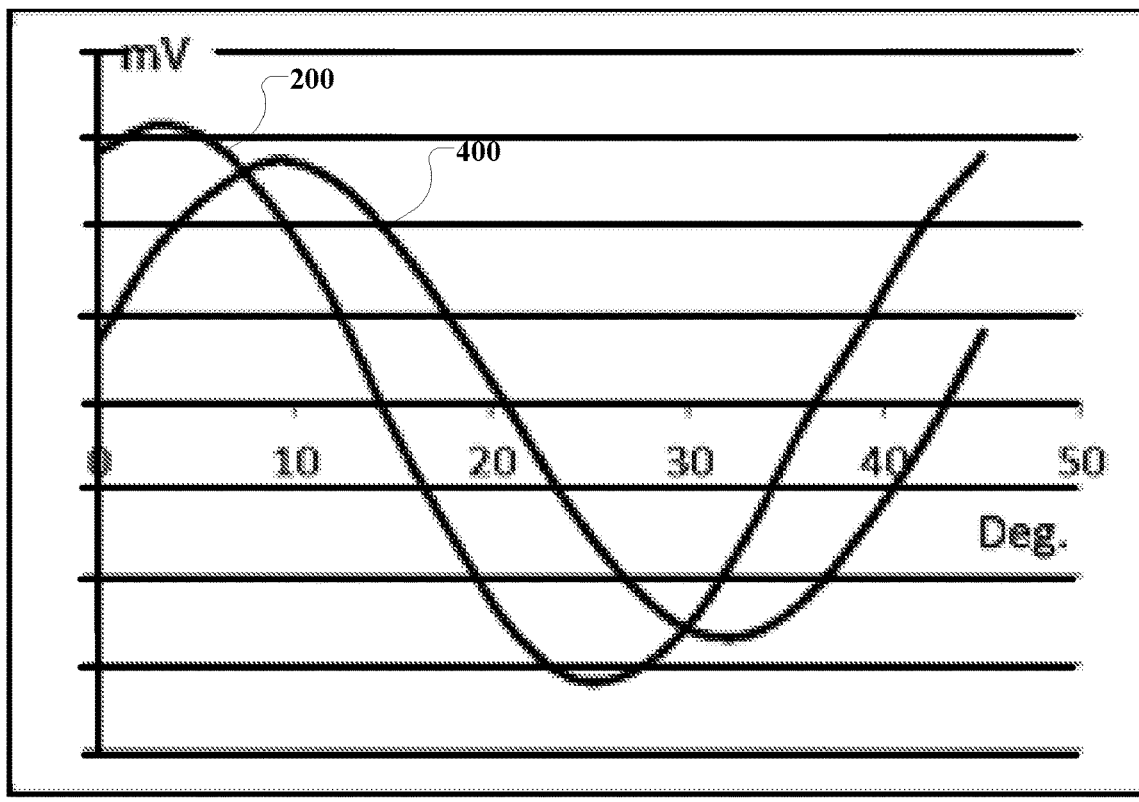
FIG. 4D is a graph depicting the amplitude response profiles of each of a symmetrical single coil rotor and a multi-coil rotor for use in an inductive position and in accordance with at least one embodiment of the present disclosure.
Figure 4E:
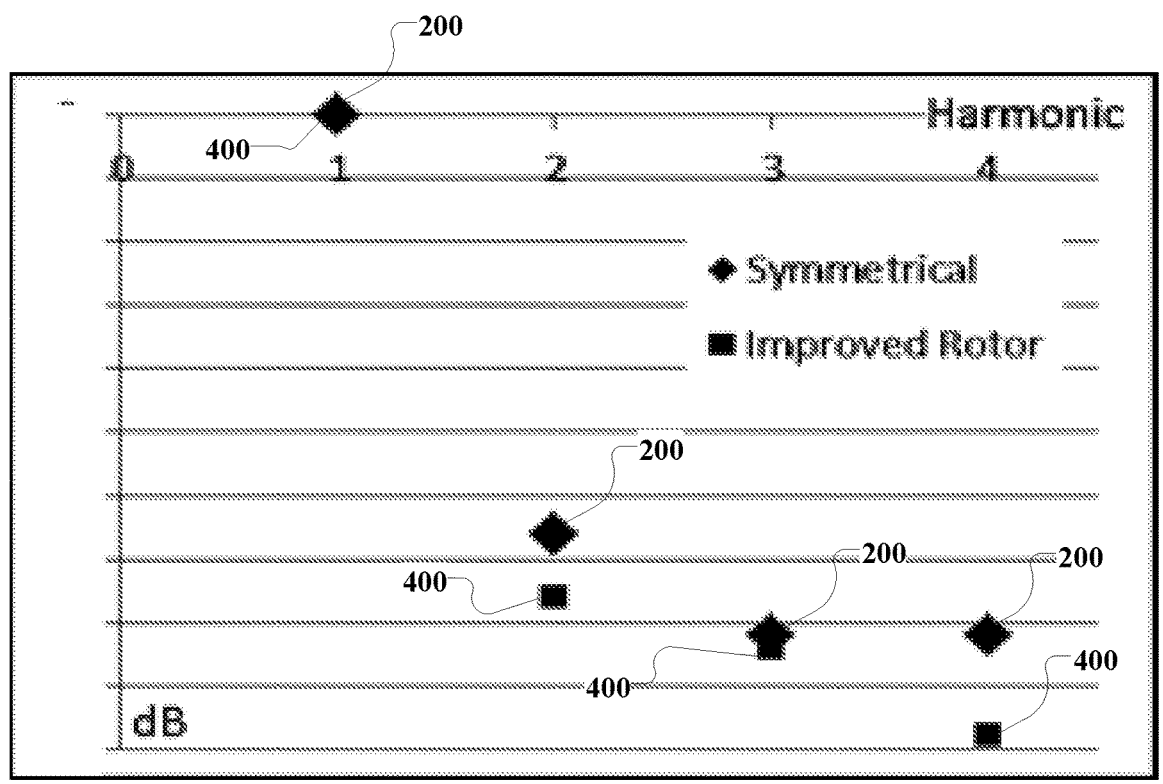
FIG. 4E is a graph depicting the harmonic response profiles of each of a symmetrical single coil rotor and a multi-coil rotor for use in an inductive position and in accordance with at least one embodiment of the present disclosure.

As shown in FIGS. 4D and 4E, for at least one embodiment of the present disclosure improved performance may be realized by a multi-coil rotor 400 versus a single coil rotor 200. More specifically, in FIGS. 4D and 4E, signal measurements for a multi-coil rotor are shown over a 45 degrees range. As shown, the expected signal period arises over the 45 degrees range, when the multi-coil rotational symmetry is 90 degrees.

Figure 5A:
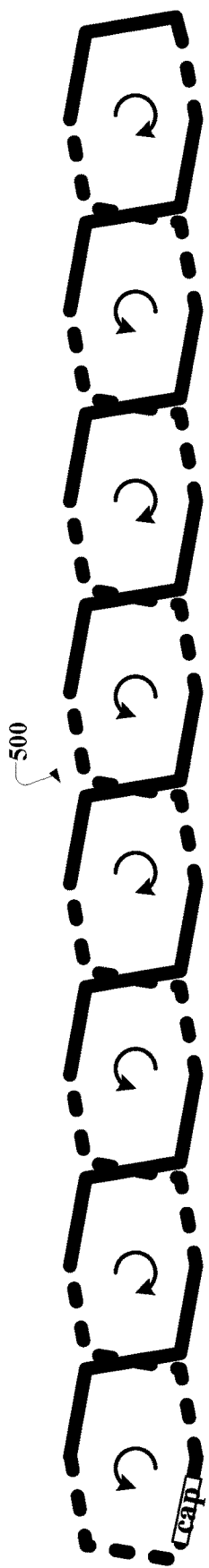
FIG. 5A is a straightened representation of the rotor coil for an angular sensor for use with an inductive position sensor and in accordance with at least one embodiment of the present disclosure.

As shown in FIG. 5A, the process of forming a sensor according to at least one embodiment of the present disclosure may include the operations of forming a straight sensor 500 and then bending the sensor 500 into a circle to form a rotary sensor. It is to be appreciated that the capacitor "cap" shown may be replaced by a short.

Figure 5C:
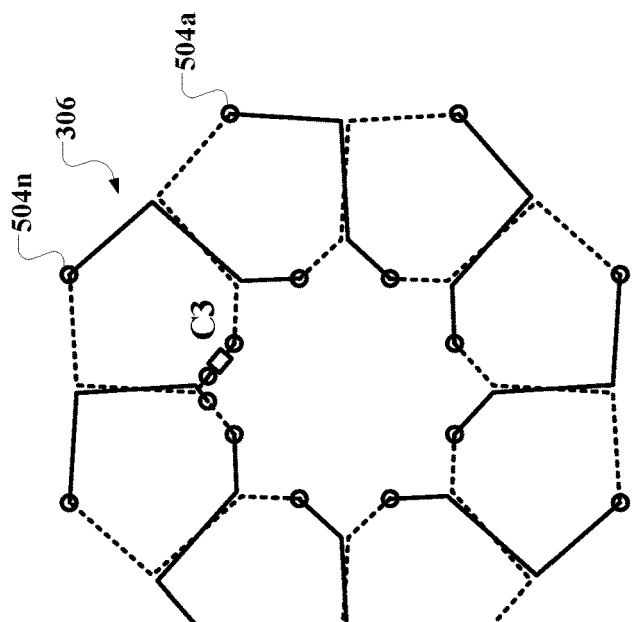
FIG. 5C is a schematic representation of a resonant rotor as drawn onto a printed circuit board for use with an inductive position sensor and in accordance with at least one embodiment of the present disclosure.
Figure 5B:
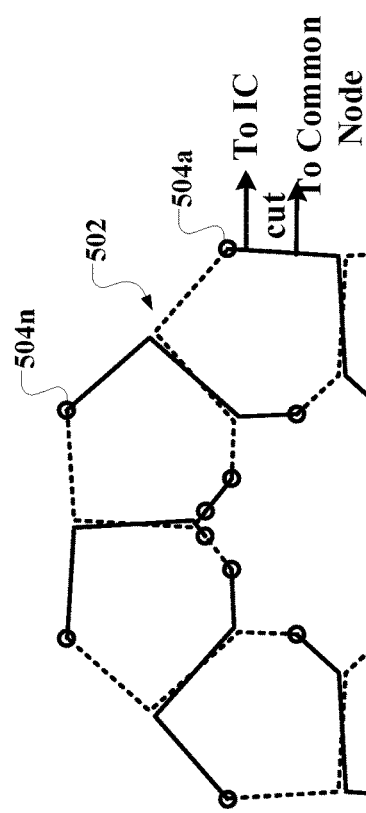
FIG. 5B is a schematic representation of the stator for an angular sensor of FIG. 5A as drawn onto a printed circuit board for use with an inductive position sensor and in accordance with at least one embodiment of the present disclosure.

In FIG. 5B, a layout of an inductive sensor 502 in accordance with at least one embodiment of the present disclosure is shown as interconnected on an PCB using nodes 504a-504n. It is to be appreciated that when multiple excitation coils and multiple receive coils are used, an opening or "cut" somewhere to the coil is used to facilitate interconnection of the coils to each of a common node and to the integrated circuit.

In FIG. 5C, the layout of a resonant rotor 306 in accordance with at least one embodiment of the present disclosure is shown. Like the stator, the resonant rotor layout may be substantially the same with the addition of capacitor C3.

Figure 6:
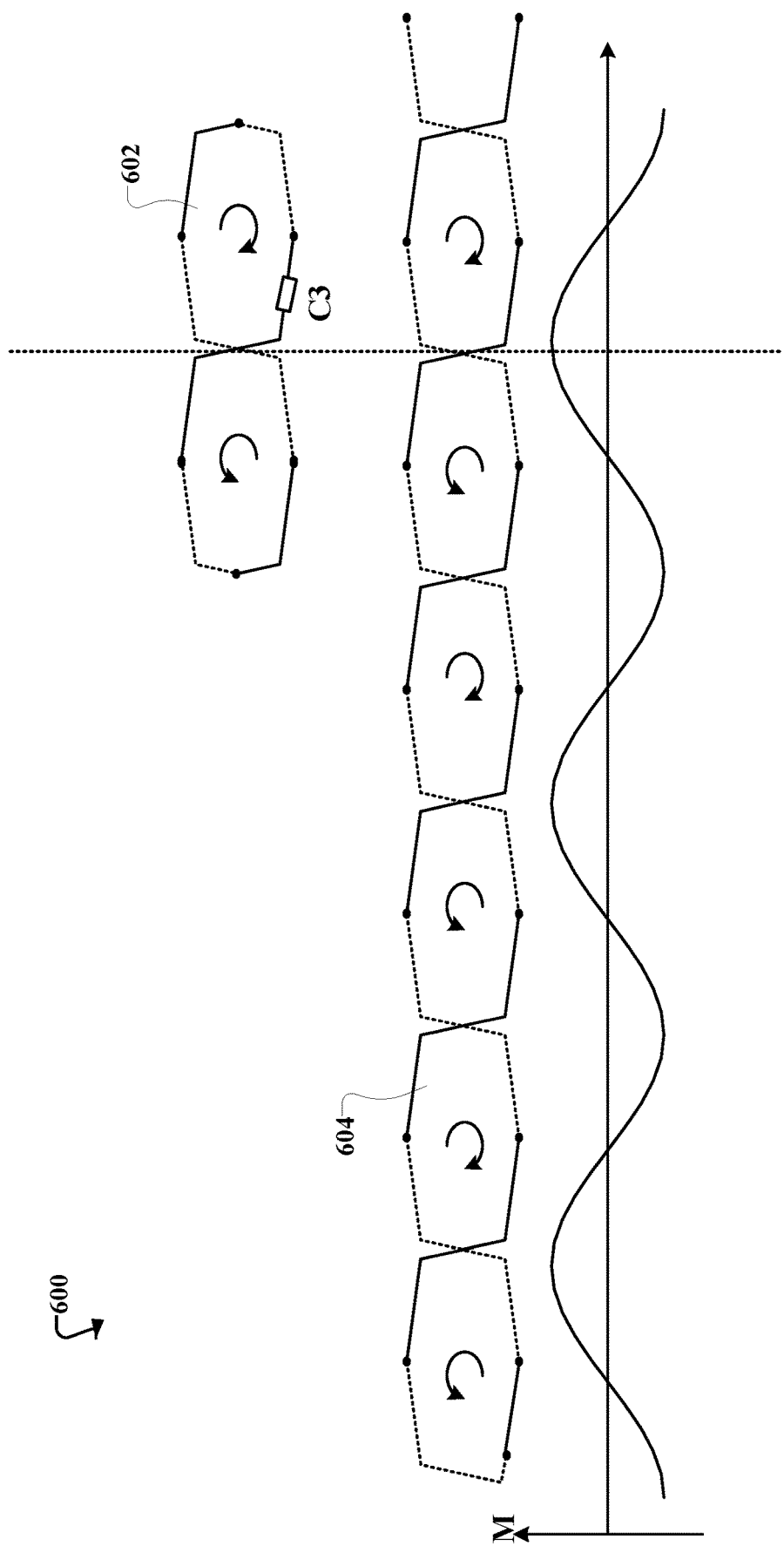
FIG. 6 is a schematic representation of a use of an inductive position sensor as a linear position sensor and in accordance with at least one embodiment of the present disclosure.

In FIG. 6, an embodiment of a linear position sensor 600 is shown in accordance with at least one embodiment of the present disclosure. As shown for a single twisted loop rotor configuration moving above a stator coil having a twisted two or more loop configuration, a mutual inductance will arise. The principles of operation of the linear position sensor 600 are substantially the same as those of the rotational position sensor embodiments discussed above with a noted exception being that a signal processor (not shown) connected to the linear position sensor 600 may be configured to convert an angular displacement of the linear rotor 602 into a linear displacement instead of an angular displacement. For example, a movement of the linear rotor 602 by one (1) inch across a linear stator 604 may result in a movement of the rotor relative to the stator, as sensed by the linear position sensor of one (1) degree. It is to be appreciated that for at least one embodiment the sensed angle of deflection is proportional to the linear displacement of the target. As further shown in FIG. 6, the relative amplitude of the mutual inductances generated between the rotor and one or more receive coils in the linear stator 604 may form a sinusoidal form, where a movement of the rotor by the same period will result in a maximum coupling of the linear rotor to the linear stator when a middle of the linear rotor is aligned with a middle of one or more loops of the linear stator. Further, it is to be appreciated that for at least one embodiment, the linear position sensor 600 may include use of a multi-excitation coil and/or a multi-receive coil configuration, as discussed above with respect to other embodiments of the present disclosure. Further, the linear position sensor 600 may include use of a linear rotor 602 having one or more rotor coils drawn thereon. The linear rotor 602 may include a capacitor, such as capacitor C3, to provide a resonant linear rotor. A capacitor may alternatively be used to provide a resonant linear excitation circuit or a resonant linear receive circuit.

Accordingly, various embodiments of an inductive position sensor are described. One or more of such embodiments may be configured for use as a rotational or a linear position sensor. Various embodiments may include the use of multiple receive coils drawn onto a substrate proximate to corresponding excitation coils. Various embodiments may include the use of resonant circuits, such as a resonant excitation circuit, a resonant receive circuit and a resonant rotor circuit. Various embodiments may include the use of rotors having multiple rotor coils. Further, methods of manufacturing of one or more embodiments of the inductive position sensor may be used in accordance with known and/or future arising manufacturing principles and materials. Further, use of an inductive position sensor according to an embodiment of the present disclosure may arise in conjunction with any known or future arising targets.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "about", "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "before", "after", and other similar terms are used for description and ease of reference purposes only and are not intended to be limiting to any orientation or configuration of any elements or sequences of operations for the various embodiments of the present disclosure. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A resonant rotor, for use in an inductive position sensor, comprising:
   a printed circuit board (PCB) comprising:
   a rotor core;
   a first rotor coil; and
   a rotor capacitor;
   wherein the first rotor coil includes a first twisted rotor loop; and
   wherein the rotor capacitor is connected in parallel with the first rotor coil on the PCB; and
   wherein the resonant rotor induces signals in each of two or more receive coils interconnected using one at least one of a common receive node and a three-phase circuit.

2. The resonant rotor of claim 1,
   wherein the first twisted rotor loop includes a full 360-degree mechanical turn.

3. The resonant rotor of claim 1,
   wherein the first rotor coil includes a second twisted rotor loop.

4. The resonant rotor of claim 3,
   wherein the first twisted rotor loop is drawn symmetrically relative to the second twisted rotor loop.

5. The resonant rotor of claim 1, comprising:
   a second twisted rotor loop off offset by ninety degrees relative to the first twisted rotor loop.

6. The resonant rotor of claim 3,
   wherein the second twisted rotor loop is rotated, relative to the first twisted rotor loop, by half a rotational symmetry of the first twisted rotor loop.

7. The resonant rotor of claim 1,
   wherein the first rotor coil has a first symmetry;
   wherein the inductive position sensor includes a stator;
   wherein an excitation coil is drawn on the stator and has a second symmetry; and
   wherein the first symmetry substantially corresponds to the second symmetry.

8. The resonant rotor of claim 1,
   wherein the rotor core is a single layer substrate.

9. A resonant rotor comprising:
   a printed circuit board (PCB) comprising:
   a rotor core;
   a first rotor coil; and
   a rotor capacitor;
   wherein the first rotor coil includes a first twisted rotor loop; and
   wherein the rotor capacitor is connected in parallel with the first rotor coil on the PCB;
   wherein the resonant rotor is configured for use with an inductive position sensor;
   wherein the inductive position sensor comprises:
   an excitation element comprising:
      a power source;
      a control circuit;
      a first excitation coil, coupled to the power source, configured to generate a first electromagnetic field;
      a second excitation coil, coupled to the power source, configured to generate a second electromagnetic field;
      a third excitation coil, coupled to the power source, configured to generate a third electromagnetic field;
      wherein the control circuit controls a flow of electrical currents from the power source into and through one or more pairings of the first excitation coil, the second excitation coil and the third excitation coil;
   a receive element, comprising:
      a signal processor;
      a first receive coil, coupled to the signal processor, configured for at least one of the first electromagnetic field, the second electromagnetic field and the third electromagnetic field to induce a first voltage; and
      a second receive coil, coupled to the signal processor, configured for at least one of the first electromagnetic field, the second electromagnetic field and the third electromagnetic field to induce a second voltage;
      a third receive coil, coupled to the signal processor, configured for at least one of the first electromagnetic field, the second electromagnetic field and the third electromagnetic field to induce a third voltage;
   wherein the resonant rotor, based upon a current position of a target, is configured for coupling with each of the first electromagnetic field, the second electromagnetic field and the third electromagnetic field; and
   wherein the signal processor determines the current position of an object coupled to the resonant rotor based on a received voltage, wherein the received voltage is a combination of at least one of the first voltage, the second voltage and the third voltage.

10. The resonant rotor of claim 9,
    wherein each of the first excitation coil, the second excitation coil and the third excitation coil and each of the first receive coil, the second receive coil and the third receive coil are looped around a stator core; and
    wherein each of the first excitation coil, the second excitation coil and the third excitation coil are connected in an excitation coil configuration comprising one of a common excitation node and a three-phase circuit.

11. The resonant rotor of claim 9,
wherein each of the first receive coil, the second receive coil and the third receive coil are connected in a receive coil configuration comprising one of a common receive node and a three-phase circuit.

12. The resonant rotor of claim 9,
wherein the control circuit selectively provides electrical power to each of the first excitation coil, the second excitation coil and the third excitation coil in an anti-series configuration; and
wherein the control circuit selectively connects the signal processor to each of the first receive coil, the second receive coil and the third receive coil in the anti-series configuration.

13. The resonant rotor of claim 1,
wherein the inductive position sensor comprises two or more excitation coils;
wherein a first set of mutual inductance arises between the two or more excitation coils and the rotor; and
wherein a second set of mutual inductances arise between the two or more receive coils and the rotor; and
wherein each of the first set of mutual inductances and the second set of mutual inductances are approximated by sine waveform functions of the rotor position.

14. The resonant rotor of claim 13,
wherein a third set of mutual inductances arise between the two or more excitation coils and the two or more receive coils;
wherein the third set of mutual inductances generate a quadrature signal in a received voltage provided by the two or more receive coils; and
wherein the first capacitor eliminates the quadrature signal.

15. The resonant rotor of claim 9,
wherein a corresponding excitation to rotor mutual inductance exists between each of the first excitation coil, the second excitation coil and the third excitation coil and the rotor;
wherein a corresponding rotor to receive mutual inductance exists between each of the first receive coil, the second receive coil and the third receive coil and the rotor;
wherein the position of the rotor at a given time results in a coupling of the corresponding excitation to rotor mutual inductance and the rotor to receive mutual inductance; and
wherein the coupling is reflected in at least one of the first voltage, second voltage and third voltage.

16. A method for determining a position of an object using an inductive position sensor comprising:
generating a first electromagnetic field using a first excitation coil;
generating a second electromagnetic field using a second excitation coil;
generating a third electromagnetic field using a third excitation coil;
inducing a first voltage in a first receive coil;
inducing a second voltage in a second receive coil;
inducing a third voltage in a third receive coil;
determining based on the first voltage, the second voltage and the third voltage a position of an object coupled to a resonant rotor;
wherein the resonant rotor is coupled to each of the first electromagnetic field, the second electromagnetic field and the third electromagnetic field;
wherein a corresponding rotor to receive coil mutual inductance arises between the resonant rotor and each of the first receive coil, the second receive coil and the third receive coil;
wherein a change in the position of the object changes each of the corresponding rotor to receive coil mutual inductances and thereby the first voltage, second voltage and third voltage induced in the respective first receive coil, second receive coil and third receive coil; and
wherein the resonant rotor substantially eliminates any mutual inductances arising between one or more of the first excitation coil, the second excitation coil and the third excitation coil with one or more of the first receive coil, the second receive coil and the third receive coil.

17. A resonant inductive position sensor comprising:
a resonant rotor;
two or more excitation coils, each uniquely inductively coupled to the resonant rotor; and
two or more receive coils, each second uniquely inductively coupled to the resonant rotor;
wherein the resonant rotor has a first symmetry;
wherein the two or more excitation coils have a second symmetry;
wherein the two or more receive coils have a third symmetry; and
wherein at least one of the first symmetry and the second symmetry is substantially identical to the third symmetry;
a signal processor configured to determine a position of an object coupled to the resonant rotor based upon voltages induced in each of the two or more receive coils;
wherein the voltages are induced based upon a first set of mutual inductances arising between the two or more excitation coils and the resonant rotor and a second set of mutual inductances arising between the resonant rotor and the two or more receive coils; and
wherein the resonant rotor includes at least one rotor coil having a twisted loop design and a capacitive element configured to substantially eliminate, from voltages induced in the two or more receive coils, a third set of mutual inductances arising between the two or more excitation coils and the two or more receive coils.

18. The resonant inductive position sensor of claim 17,
wherein each of the two or more excitation coils are drawn as first twisted loops about a stator core;
wherein each of the two or more receive coils are drawn as second twisted loops about the stator core;
wherein the resonant rotor comprises at least one rotor coil drawn as a twisted rotor loop about a rotor core; and
wherein at least one of a first symmetry for the first twisted loops and a second symmetry for the second twisted loops substantially matches a third symmetry for the twisted rotor loops.

* * * * *